(12) United States Patent
Young (10) Patent No.: US 7,914,408 B2
(45) Date of Patent: Mar. 29, 2011

(54) MULTIPLE-CUSHION RING SPROCKET ASSEMBLY

(75) Inventor: James D. Young, Chesaning, MI (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 509 days.

(21) Appl. No.: 11/541,209

(22) Filed: Sep. 29, 2006

(65) Prior Publication Data

US 2007/0293361 A1 Dec. 20, 2007

Related U.S. Application Data

(60) Provisional application No. 60/721,715, filed on Sep. 29, 2005, provisional application No. 60/834,015, filed on Jul. 28, 2006.

(51) Int. Cl.
*F16H 55/30* (2006.01)
(52) U.S. Cl. .......................... 474/152; 474/156
(58) Field of Classification Search .................. 474/152, 474/156, 161
See application file for complete search history.

(56) References Cited

U.S. PATENT DOCUMENTS

| | | | |
|---|---|---|---|
| 2,492,219 A | 4/1945 | Haefeli | |
| 2,953,930 A | 9/1960 | Meyer | |
| 3,057,219 A | 10/1962 | Montgomery | |
| 3,523,463 A | 8/1970 | Van Thielen | |
| 4,082,372 A | 4/1978 | Kozuki | |
| 4,227,422 A | 10/1980 | Kwawshima et al. | |
| 4,261,214 A * | 4/1981 | Watanabe et al. | 474/156 |
| 4,348,199 A | 9/1982 | Oonuma et al. | |

(Continued)

FOREIGN PATENT DOCUMENTS

| | | |
|---|---|---|
| DE | 100 25 736 | 12/2000 |
| DE | 199 29 667 | 1/2001 |
| DE | 199 61 046 | 6/2001 |
| GB | 2 086 817 | 5/1982 |
| JP | 57 186654 | 11/1982 |
| JP | 57 190160 | 11/1982 |
| WO | WO 03/089814 | 10/2003 |
| WO | WO 2004/059194 | 7/2004 |
| WO | WO 2004059194 A1 * | 7/2004 |

OTHER PUBLICATIONS

Young, James D., SAE Technical Paper Series publication titled "*Camshaft Roller Chain Drive with Reduced Meshing Impact Noise Levels*", circulated at Noise & Vibration Conference and Exhibition, Michigan, May 5-8, 2003, ISSN 0148-7191. International Standard ISO 606:2004(E), 2004.
International Preliminary Report on Patentability, Application No. PCT/US2006/038058.

*Primary Examiner* — Robert A Siconolfi
*Assistant Examiner* — Stephen Bowes
(74) *Attorney, Agent, or Firm* — Fay Sharpe LLP (57) ABSTRACT

A cushion ring sprocket assembly includes a sprocket body with a plurality of teeth arranged in a row. The sprocket body includes first and second opposite axial tooth faces and first and second hubs that extend axially outward relative to the first and second tooth faces. First and second sets of cushion rings are captured on said first and second hubs, respectively. The first set of cushion rings includes at least a first inner cushion ring eccentrically located on the first hub and a first outer cushion ring eccentrically located on the first inner cushion ring. The second set of cushion rings includes at least a second inner cushion ring eccentrically located on the second hub and a second outer cushion ring eccentrically located on the second inner cushion ring. The first and second outer cushion rings are adapted to be contacted and deflected by link plates of an associated chain, so that the first and second outer cushion rings contact and deflect the respective first and second inner cushion rings. First and second retaining devices are connected to the first and second hubs to capture the first and second ring sets on the first and second hubs, respectively.

12 Claims, 8 Drawing Sheets

U.S. PATENT DOCUMENTS

| | | | |
|---|---|---|---|
| 5,055,093 A * | 10/1991 | Denker | 475/167 |
| 5,224,903 A | 7/1993 | Langhof et al. | |
| 5,360,378 A | 11/1994 | Suzuki et al. | |
| 5,397,278 A | 3/1995 | Suzuki et al. | |
| 6,371,874 B1 * | 4/2002 | Inoue | 474/156 |
| 6,419,604 B2 | 7/2002 | Saito et al. | |
| 6,652,402 B2 | 11/2003 | Poiret et al. | |
| 6,910,980 B2 | 6/2005 | Hamilton | |
| 2004/0185977 A1 | 9/2004 | Young et al. | |
| 2004/0204274 A1 | 10/2004 | Young | |
| 2005/0170925 A1 * | 8/2005 | Hamilton | 474/161 |
| 2006/0160648 A1 | 7/2006 | Hummel et al. | |

\* cited by examiner

MULTIPLE-CUSHION RING SPROCKET ASSEMBLY

CROSS-REFERENCE TO RELATED APPLICATIONS

This application claims priority from and benefit of the filing date of U.S. provisional application Ser. No. 60/721,715 filed Sep. 29, 2005 and U.S. provisional application Ser. No. 60/834,015 filed Jul. 28, 2006, and both of said provisional applications are hereby expressly incorporated by reference into the present specification.

BACKGROUND

Sprockets incorporating metal cushion rings have been used in automotive engine roller chain drive systems such as camshaft and balance shaft drives. The purpose of the cushion rings is to buffer or soften the roller-sprocket collision at the onset of meshing, thereby acting to reduce the chain meshing noise levels associated with roller chain drive systems. Roller-sprocket impact at the onset of meshing is the dominant noise source associated with roller chain drive systems and it occurs when a chain link leaves the span and its meshing roller collides with the sprocket tooth at engagement. It is believed that multiple roller-sprocket tooth impacts occur during the meshing phenomena and these impacts contribute to the undesirable noise levels associated with roller chain drives.

Figure 1:
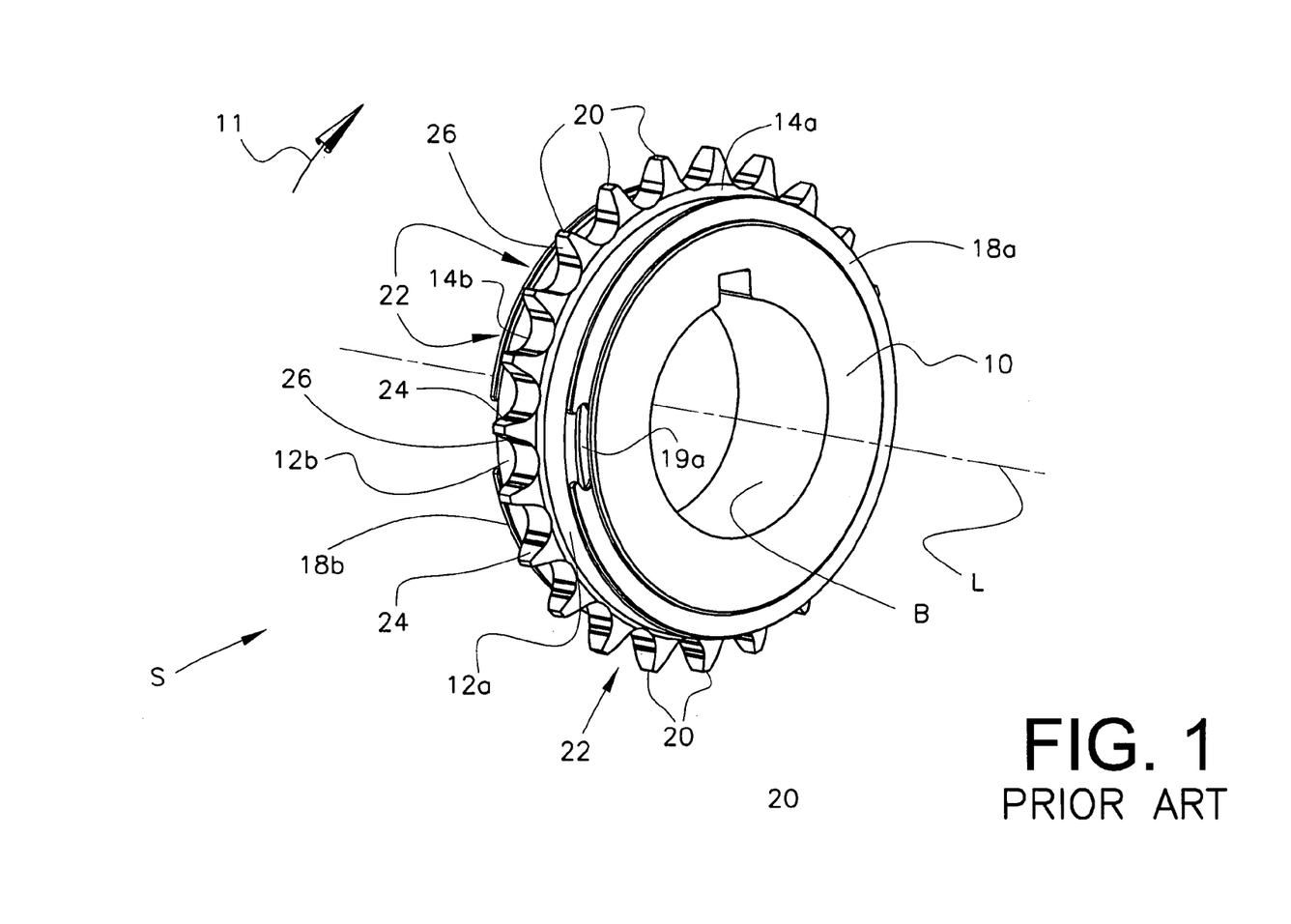
FIG. 1 is an isometric view of a conventional sprocket assembly with metal cushion rings.
Figure 2:
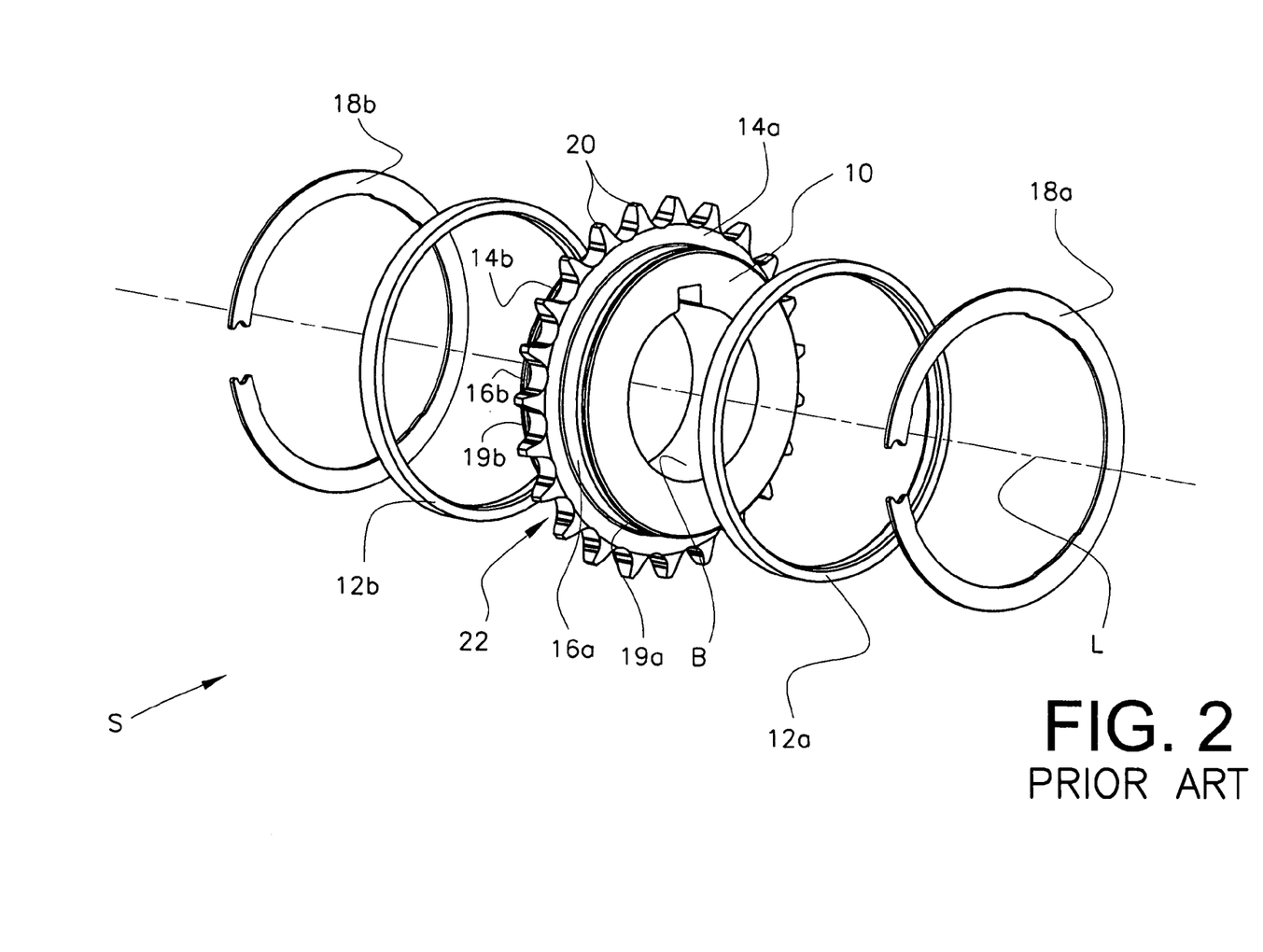
FIG. 2 is an exploded isometric view of the sprocket shown in FIG. 1.

FIGS. 1 and 2 illustrate a conventional sprocket assembly S including a sprocket body 10, circular metal cushion rings 12a, 12b positioned respectively adjacent first and second axial faces 14a, 14b of a sprocket body 10. The sprocket body 10 defines a bore B or other recess about a central axis of rotation L, and first and second hubs 16a, 16b project axially outward in opposite directions from the first and second faces 14a, 14b, respectively. The hubs 16a, 16b each define a cylindrical outer diameter that is centered on the axis L and that is received within the inner diameter of each of the rings 12a, 12b. The inner diameter of the rings 12a, 12b is larger than the outer diameter of the hubs 16a, 16b so that the rings 12a, 12b are able to float eccentrically thereon.

First and second retaining devices such as retaining rings/clips 18a, 18b are seated in grooves 19a, 19b of the hubs 16a, 16b and capture the first and second rings 12a, 12b on the first and second hubs, while still allowing the eccentric floating movement of the rings 12a, 12b on the outer diameter of the hubs. Other retaining devices or means for retaining/capturing the first and second rings 12a, 12b on the hubs can be used, e.g., welded plates or other clipping arrangements can be attached to the first and second hubs to capture the first and second rings, respectively.

The sprocket body 10 further comprises a plurality of teeth 20 defined therein and separated from each other by tooth spaces 22. Each tooth 20 includes an "engaging" or "drive" flank 24 and a "disengaging" or "coast" flank 26, with the drive flank 24 being downstream relative to the coast flank 26 in terms of the direction in which the sprocket rotates (see arrow 11). As such, the tooth spaces 22 are defined between circumferentially successive drive and coast flanks 24, 26. The teeth 20 (and tooth spaces 22) can be either symmetrical or asymmetrical.

The sprocket body 10 is defined from any suitable material such as one-piece construction by compacted powdered metal techniques, or machined from steel, or the like. The rings 12a, 12b are typically defined from a suitable metal such as bearing-grade steel.

As is well known, the link plates of an associated chain, e.g., a roller chain or bush chain, will come into contact with the outside diameter of the cushion rings 12a, 12b prior to chain-sprocket meshing, and this contact serves to control and dampen transverse vibration in the chain span, and thereby buffer or soften roller-sprocket impact during the meshing phenomenon. As the chain link plates come into contact with and lay on the outer surface of the rings 12a, 12b during the onset of meshing, the rings 12a, 12b gradually move to a position and/or deform to a shape that allows the chain rollers to mesh fully with the sprocket teeth 20 in the tooth spaces 22. Sprocket assemblies S as described are typically used in automotive chain drive systems such as timing and/or balance shaft drive systems.

BRIEF DESCRIPTION OF DRAWINGS

The invention comprises various components and arrangements of components, preferred embodiments of which are illustrated in the accompanying drawings wherein.

DETAILED DESCRIPTION OF THE INVENTION

FIGS. 3-7B illustrate a sprocket assembly SA formed in accordance with the present invention as part of a chain drive system CDS (see FIGS. 7A, 7B) such as an automotive timing or balance drive system or the like. The chain drive system CDS comprises the sprocket assembly SA and at least one other sprocket (not shown) and a conventional chain C meshed with the sprocket assembly SA and the one or more other sprockets. The chain C is shown herein as a roller chain but can also be a bush chain or other type of chain that can mesh with the sprocket assembly SA. For ease of discussion, as used herein, the term "roller chain" is intended to encompass both a roller chain and a bush chain, i.e., a chain where rotating rollers are not included on the chain bushings. The sprocket assembly SA can be either a drive sprocket or a driven sprocket.

The sprocket assembly SA comprises sprocket body 110. First and second sets of metal cushion rings 112a, 112b are positioned respectively adjacent first and second axial faces 114a, 114b of the sprocket body 110. Each set 112a, 112b of metal cushion rings comprises at least two separate (inner and outer) circular metal cushion rings, i.e., inner and outer rings 112a1, 112a2 for the first set 112a and inner and outer rings 112b1, 112b2 for the second set 112b as described in further detail below (see also FIGS. 5 and 6).

Figure 3:
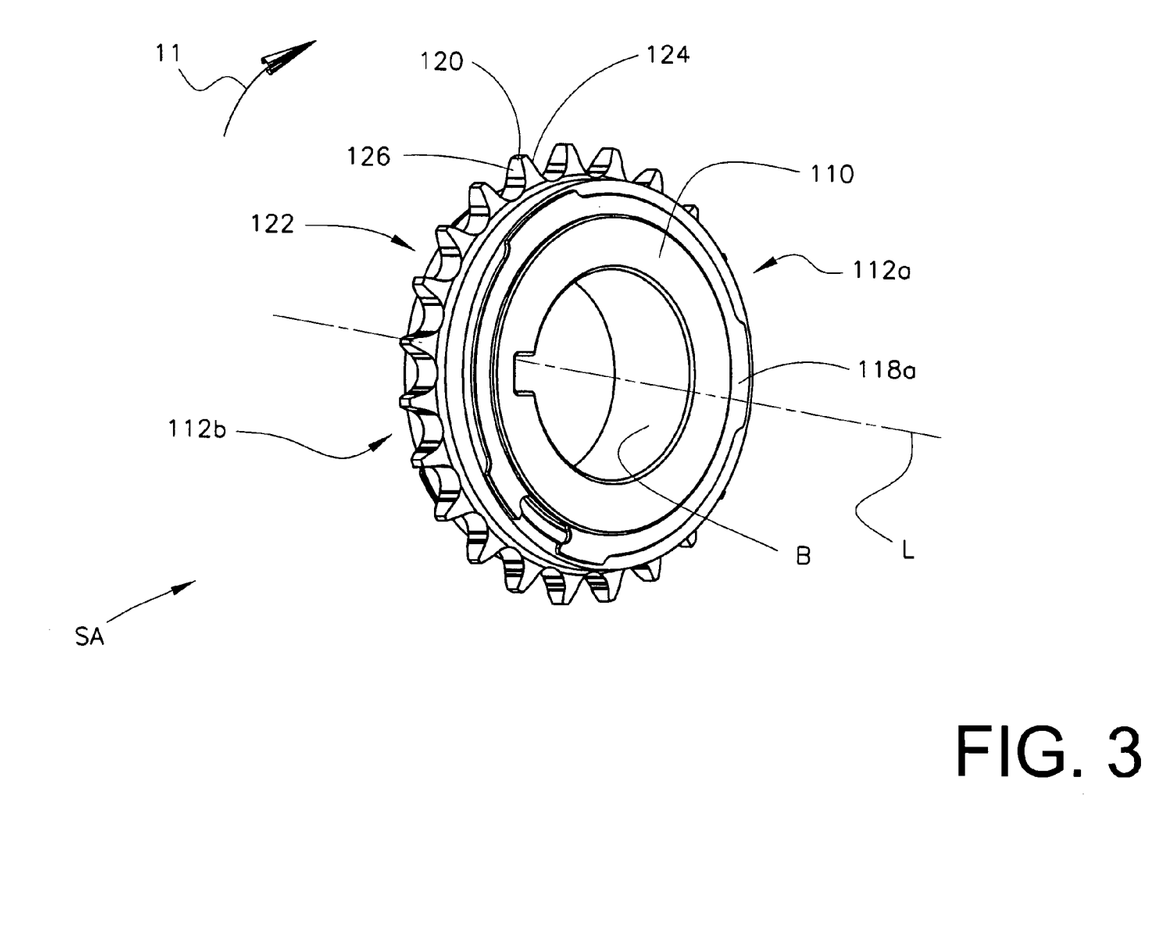
FIG. 3 is an isometric view of a multiple-cushion ring sprocket assembly formed in accordance with the present invention.
Figure 4:
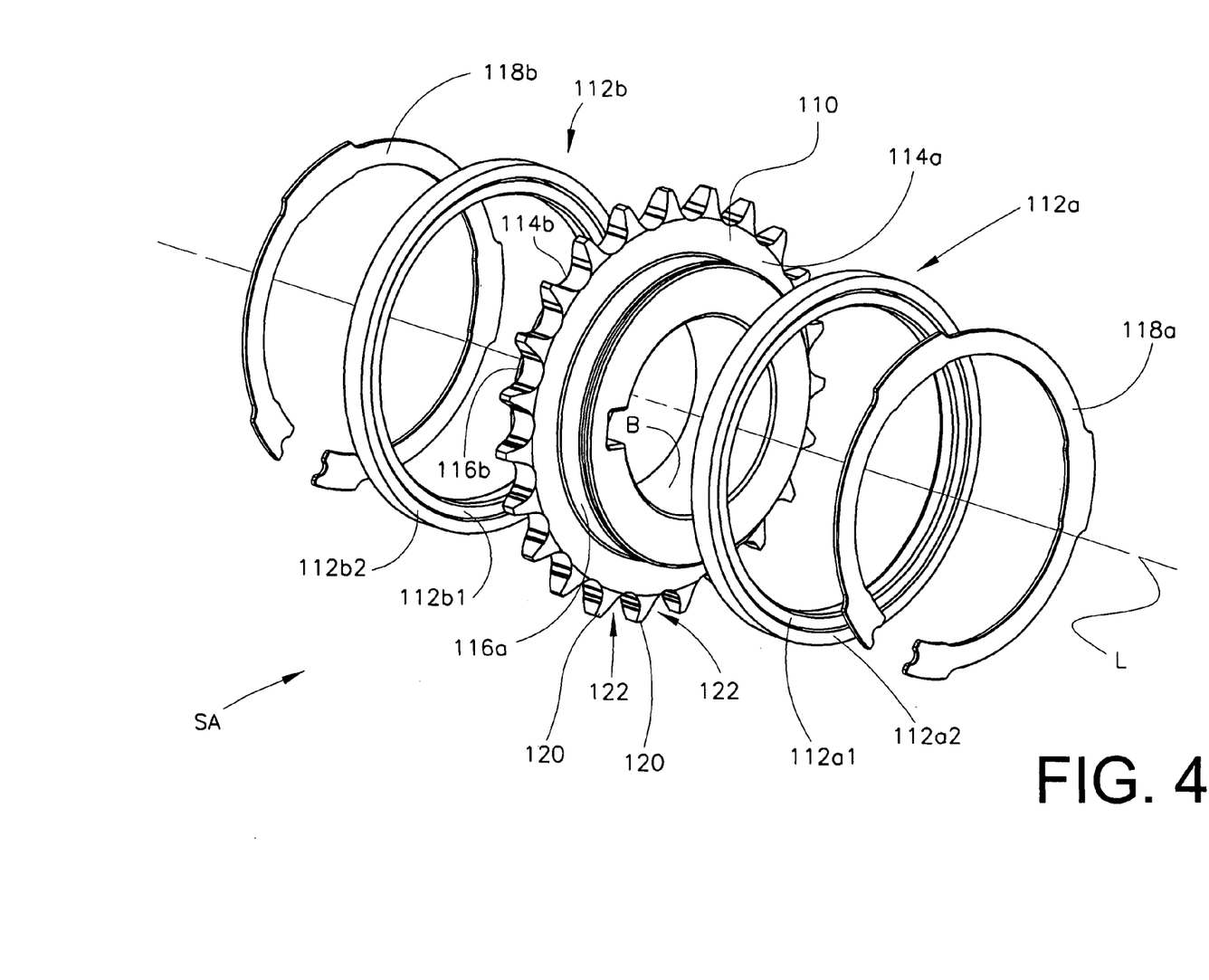
FIG. 4 is an exploded isometric view of the sprocket shown in FIG. 3.

The sprocket body 110 includes a bore B or recess defined about a central axis of rotation L that receives a drive shaft or a driven shaft (not shown). The sprocket body 110 is defined as a one-piece or multi-piece construction by compacted powdered metal techniques, or machined from steel, or the like. The rings 112a1, 112a2, 112b1, 112b2 are preferably defined from a suitable metal such as bearing-grade steel.

The sprocket body 110 further comprises or defines a plurality of teeth 120 that extend circumferentially around the body 110 in a row and that project radially outward therefrom axially between hubs 116a, 116b. Tooth spaces 122 are defined circumferentially between successive teeth 120. Each tooth includes an "engaging" or "drive" flank 124 (FIG. 5) and a "disengaging" or "coast" flank 126, with the drive flank 124 being downstream relative to (ahead of) the coast flank 126 in terms of the direction in which the sprocket assembly SA rotates as shown by arrow 11. As such, the tooth spaces 122 are defined between circumferentially successive drive and coast flanks 124, 126. The teeth 120 and tooth spaces 122 can be symmetrical, e.g., formed according to the ISO 606: 2004(E) standard (International Organization for Standardization) or, alternatively, some or all of the teeth 120 and tooth spaces 122 can be asymmetric as described, e.g., in the following U.S. patent documents, all of which are hereby expressly incorporated by reference into this specification: (i) U.S. Pat. No. 6,371,875; (ii) U.S. Pat. No. 6,325,734; (iii) U.S. Pat. No. 6,179,741; (iv) U.S. Pat. No. 6,090,003; (v) U.S. Pat. No. 5,997,424; (vi) U.S. Pat. No. 5,993,344; (vii) U.S. Pat. No. 5,976,045; (viii) U.S. Pat. No. 5,921,879; (ix) U.S. Pat. No. 5,921,878; and, (x) U.S. Pat. No. 5,876,295. Furthermore, all teeth 120 can be identical to each other or, alternatively, some of the teeth 120 can be different from the others and arranged in a regular or an irregular or "random" patterns on the sprocket body 110 in order to modulate the frequency of impacts between the chain rollers R and sprocket teeth 120 to reduce noise and vibration. Also, the teeth 120 can optionally be defined with "root relief" or other such "undercut root," i.e., where the root surfaces 125 interconnecting adjacent teeth, i.e., interconnecting the engaging flank 124 of one tooth with the disengaging flank 126 of another tooth, are relieved so that when a roller or bushing is fully meshed in a tooth space 122, the roller/bushing is spaced above the root surface 125 so that radial impact between the roller/bushing and root surface 125 is not possible when the rings sets 112a, 112b are fully deflected.

Figure 5:
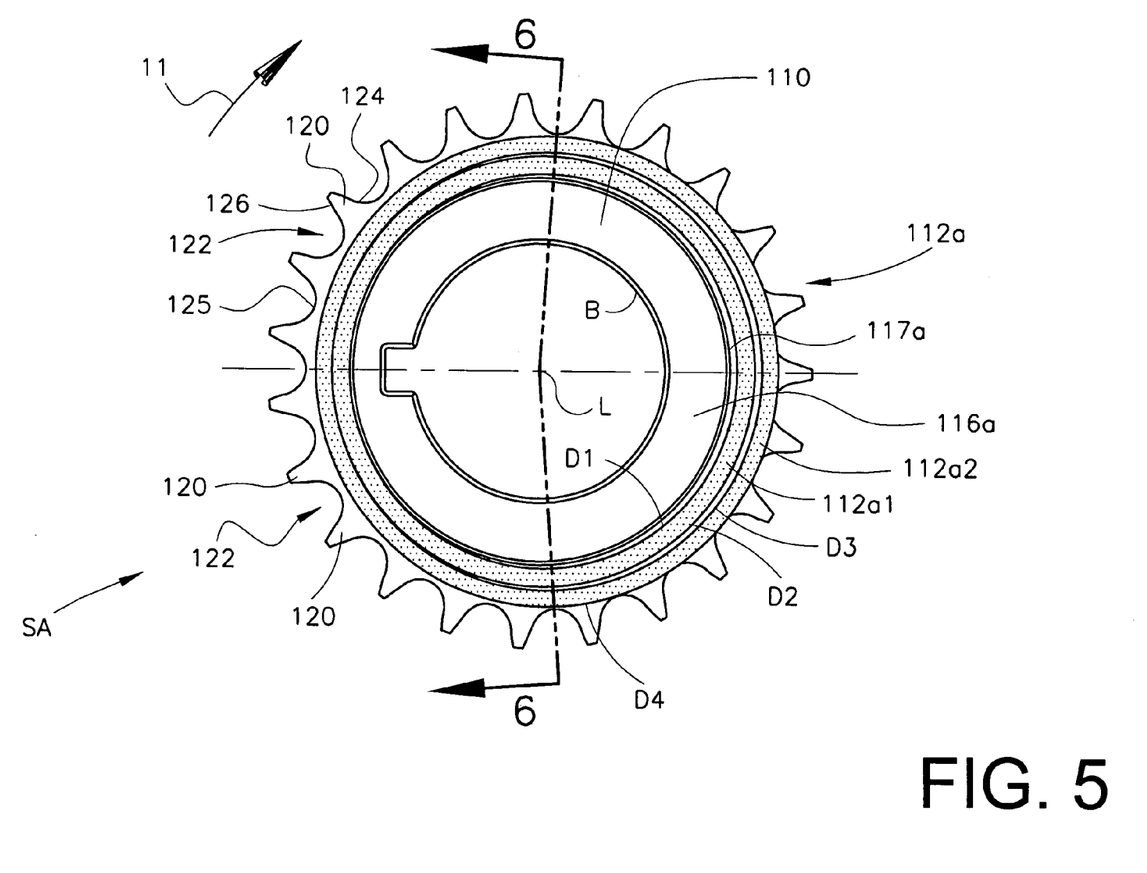
FIG. 5 is a front view of the multiple-cushion ring sprocket assembly of FIG. 3, with the cushion ring retaining clip removed to show the multiple-cushion ring structure more clearly.
Figure 6:
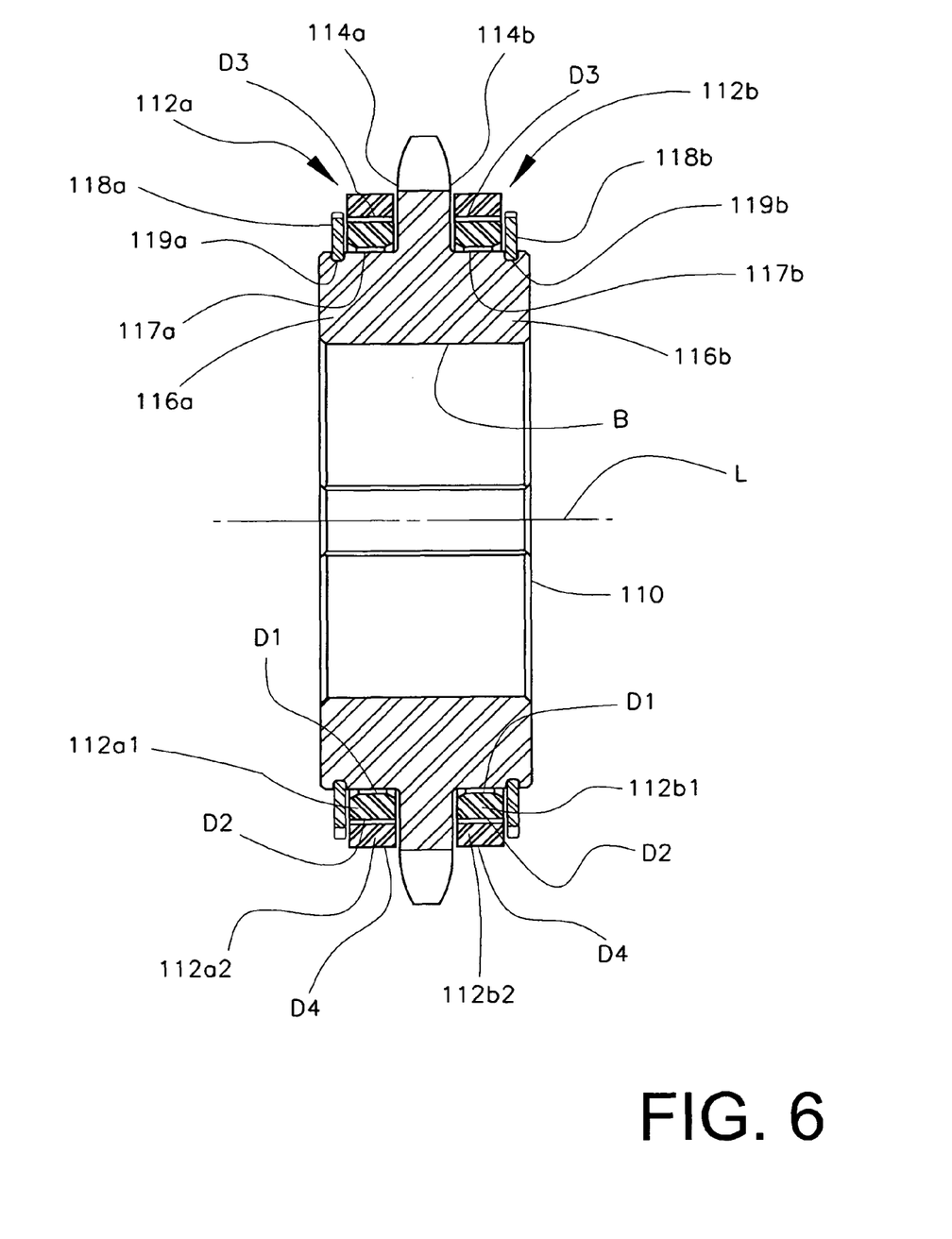
FIG. 6 is an enlarged section view taken along line 6-6 of FIG. 5 (note that the retaining clips are shown in FIG. 6 but are omitted from FIG. 5 to reveal underlying components)

With particular reference to FIGS. 4-6, it can be seen that the first and second hubs 116a, 116b project axially outward in opposite directions along the axis L from the first and second opposite tooth faces 114a, 114b, respectively. The hubs 116a, 116b define cylindrical outside diameters 117a, 117b that are centered on the axis L. The first and second inner cushion rings 112a1, 112b1 include respective circular inside diameters D1 that are received on the hub outside diameters 117a, 117b, respectively, with the inside diameters D1 being larger than the hub outside diameters so that the inner rings 112a1, 112b1 float eccentrically on the hubs 116a, 116b, respectively.

The inner rings 112a1, 112b1 also include respective outside diameters D2 on which the outer rings 112a2, 112b2 are respectively received. Specifically, the first and second outer cushion rings 112a2, 112b2 include respective inside diameters D3 that are received on the inner ring outside diameters D2, respectively, with the inside diameters D3 of the outer rings 112a2, 112b2 being larger than the outside diameters D2 of the inner rings so that the outer rings 112a2, 112b2 float eccentrically on the inner rings 112a1, 112b1, respectively. The outer rings 112a2, 112b2 also include an outer diameter D4 that is adapted to be contacted by the link plates PLP,RLP of the associated chain C of the chain drive system CDS as described below.

The first and second sets of cushion rings 112a, 112b are captured on the first and second hubs 116a, 116b adjacent the tooth faces 114a, 114b, respectively. In the illustrated embodiment, first and second retainers such as circlips 118a, 118b are connected to the first and second hubs 116a, 116b and capture the first and second ring sets 112a, 112b, respectively. The clips 118a, 118b are seated in grooves 119a, 119b of the hubs 116a, 116b. The axial space between the clips 118a, 118b and the sprocket faces 114a, 114b, respectively, is only minimally larger than the axial width of the rings 112a1, 112a2 and 112b1, 112b2 so that the rings eccentrically float freely on the hubs 116a, 116b but do not move a meaningful distance axially away from the sprocket faces 114a, 114b. This ensures that the outer rings 112a2, 112b2 are positioned properly to be engaged by the link plates PLP,RLP of the associated chain C and also ensures that the inner rings 112a1, 112b1 are always axially aligned with the respective outer rings 112a2, 112b2. The clips 118a, 118b can be replaced by other retaining means such as, e.g., flanges that are welded or otherwise connected to the hubs 116a, 116b.

Figure 7A:
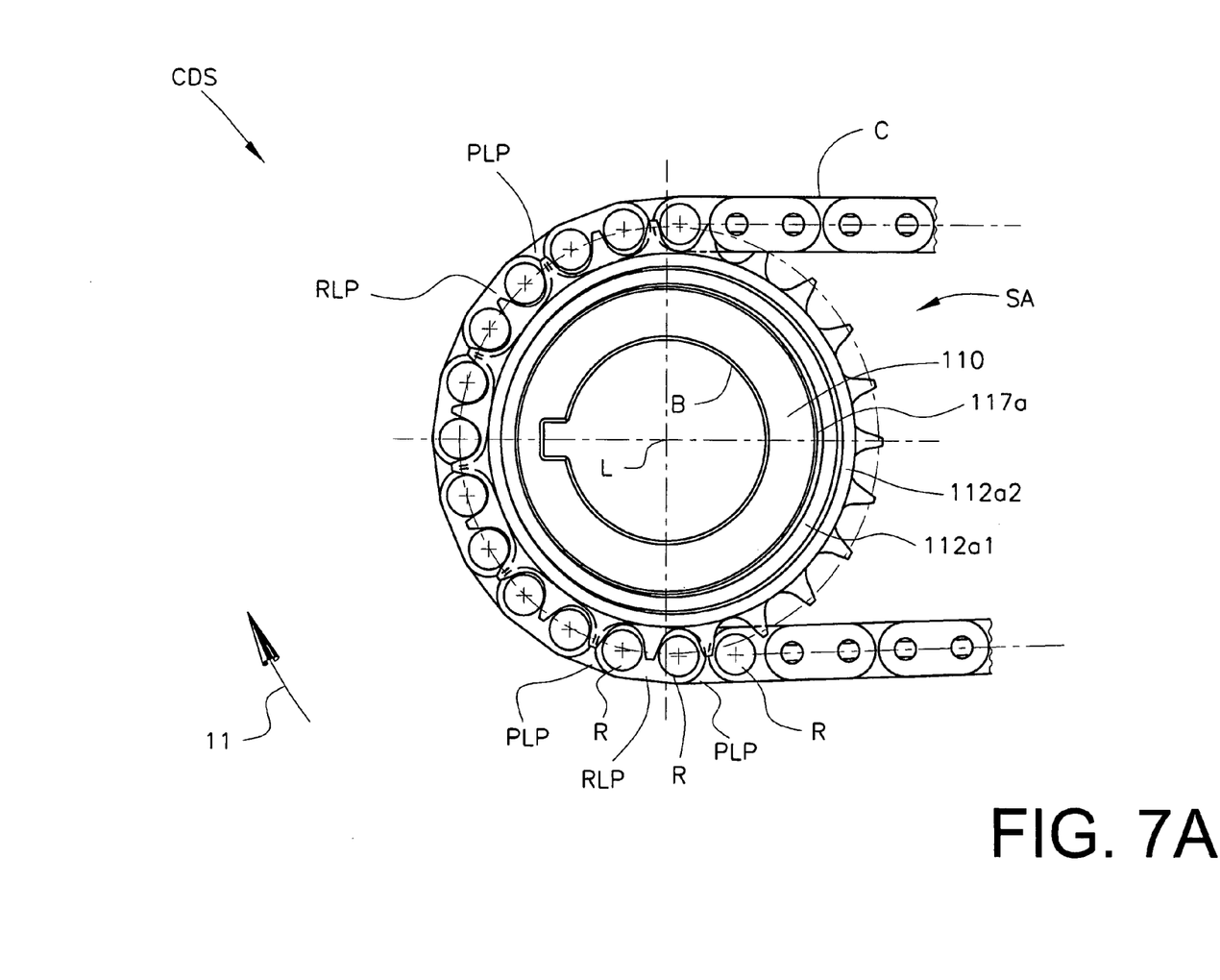
FIG. 7A shows the sprocket assembly of FIG. 5, but shows a conventional roller or bush chain wrapped on the sprocket assembly to provide a chain drive system (note that in use, the chain will deflect and/or deform both of the cushion rings from the neutral, free state in which both cushion rings are shown)
Figure 7B:
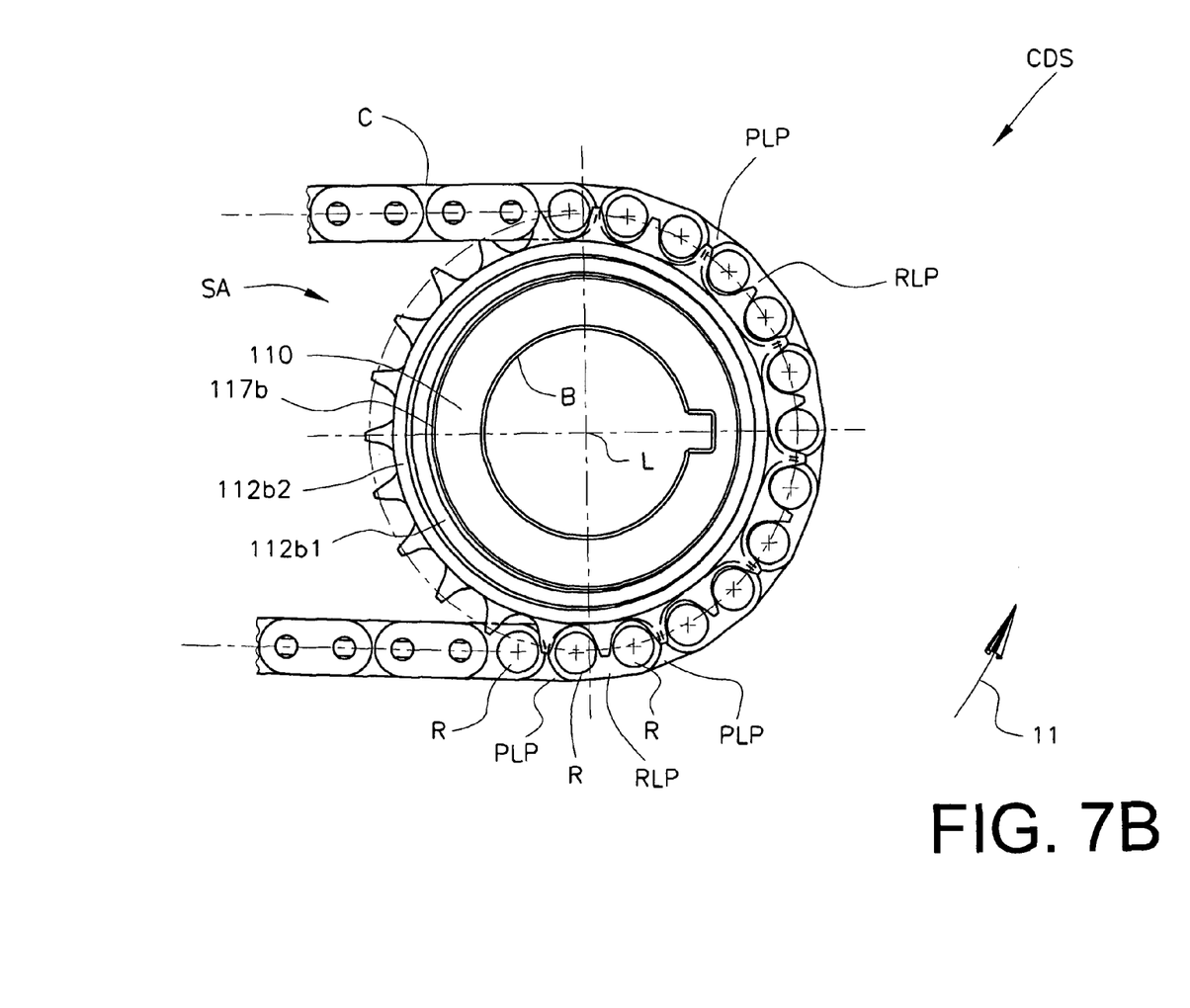
FIG. 7B shows the opposite axial side of the chain drive system of FIG. 7A.

FIGS. 7A and 7B illustrates the sprocket assembly SA as part of a chain drive system CDS. It should be noted that the conventional roller/bush chain C is shown in a somewhat diagrammatic fashion to facilitate an understanding of the present development. Those of ordinary skill in the art will recognize that the chain includes pairs of spaced-apart roller link plates RLP between which the rollers/bushings R are held, and includes pairs of spaced-apart pin link plates PLP that pivotally interconnect successive rows of roller link plates RLP. When the chain C engages the sprocket assembly SA as shown, the members of each pair of spaced-apart roller link plates RLP and the members of each pair of pin link plates PLP straddle the teeth 120 so as to lie adjacent the first and second opposite axial tooth faces 114a, 114b while the rollers/bushings R are located in respective tooth spaces 122. Those of ordinary skill in the art will recognize that the rollers/bushings R can be either rollers supported on bushings or simply the non-rotating bushings without any roller supported thereon.

FIGS. 7A and 7B shows the cushion ring sets 112a, 112b in a free state, i.e., not deflected or deformed by the chain. Those of ordinary skill in the art will recognize that, in use, the chain C is under tension and the chain link plates will deflect and/or deform the outer cushion rings 112a2, 112b2 which will, in turn, deflect and/or deform the inner cushion rings 112a1, 112b1, respectively, to allow the rollers/bushings R to mesh in the tooth spaces 122. Depending on the chain tension, which will vary in use, the amount of deflection/deformation of the inner and outer cushion rings 112a1, 112b1, 112a2, 112b2 will correspondingly vary. The ring sets 112a, 112b dampen the meshing impact between the rollers R and the sprocket teeth 120 to reduce noise and vibration.

Unlike a conventional cushion ring sprocket assembly S (FIGS. 1,2) with only a single cushion ring adjacent each axial side of the teeth 120, the multiple-ring sprocket assembly SA includes two or more cushion rings (e.g., three cushion rings) adjacent each axial side 114a, 114b of the teeth 120, with the additional cushion rings being eccentrically located between the inner and outer rings 112a1, 112a2 and inner and outer rings 112b1, 112b2. The multiple ring configuration permits greater total ring deflection, resulting in reduced transverse vibration in the chain span and better chain span control since the chain link plates PLP,RLP will contact the outer cushion rings 112a2, 112b2 earlier in the meshing process as the chain approaches the sprocket to provide an initial damping of the movement of the roller R, while the inner cushion rings 112a1, 112b1 complete the damping process in a staged fashion. The enhanced chain span control results in reduced roller-sprocket impact at the onset of meshing. Multiple rings also allow the cushioning effect of the ring sets 112a, 112b to be tuned for specific chain drive applications. As mentioned above, only the outer rings 112a2, 112b2 deflect initially to provide the initial damping rate, until their inside diameters D3 come into contact with the outside diameters D2 of the inner rings 112a1, 112b1, respectively, and at this point the damping rate will increase since both rings must then deflect in order for the chain to continue to move radially inward. Another main advantage of this multiple cushion ring configuration is the increased damping provided by the use of multiple rings, without corresponding increases in stress in the cushion rings 112a1, 112a2, 112b1, 112b2.

Ring deflection and the load required to deflect the ring sets 112a, 112b are functions of the ring diameter and the radial thickness of the ring. In the illustrated embodiment, the outer rings 112a2, 112b2 have a radial thickness which is less than the corresponding radial thickness of the inner rings 112a1, 112b1 which, in combination with the larger diameter, leads to the outer rings 112a2, 112b2 being more easily deflected/deformed relative to the inner rings 112a1, 112b1, but the rings can have the same radial thickness, or the outer rings could be thicker than the inner rings to optimize the chain span damping during meshing. Chain drive dynamics and related chain tension will influence the ring diameters and respective radial thickness for the outer and inner rings. In any case, however, the inner rings 112a1, 112b1 will be identical to each other and the outer rings 112a2, 112b2 will be identical to each other, with the term identical intended to allow for variations due to manufacturing tolerances.

In one embodiment, the cushion ring sets 112a, 112b and root surfaces 125 are dimensioned so that when the cushion ring sets 112a, 112b are fully deflected/deformed so that there is hard contact between the inner and outer rings 112a1, 112a2 and 112b1, 112b2, and also hard contact between the inner rings 112a1, 112b1 and the hubs 117a, 117b, a chain roller or bushing R carried between roller link plates RLP that are in hard contact with the fully deflected cushion ring sets 112a, 112b cannot make radial contact with the root surface 125 between successive engaging flanks 124 and disengaging flanks 126. In such case, the ring sets 112a, 112b and undercut root surfaces 125 ensure that a chain roller or bushing R can never make radial contact with the root surface 125, which is deemed beneficial for reduced noise and vibration.

The invention has been described with reference to preferred embodiments. Modifications and alterations will occur to those of ordinary skill in the art to which the invention pertains, and it is intended that the invention be construed as encompassing all such modifications and alterations according to the claims as construed literally and/or according to the doctrine of equivalents.

The invention claimed is:
1. A cushion ring sprocket assembly comprising:
a sprocket body comprising a plurality of teeth arranged in a row, first and second opposite axial tooth faces, first and second hubs extending axially outward relative to the first and second tooth faces, said first and second hubs including respective cylindrical outside diameters;
first and second sets of metal cushion rings captured on said first and second hubs, respectively;
said first set of cushion rings comprising at least a first inner cushion ring including an inside diameter eccentrically located on said cylindrical outside diameter of said first hub and a first outer cushion ring including an inside diameter eccentrically located on an outside diameter of the first inner cushion ring;
said second set of cushion rings comprising at least a second inner cushion ring including an inside diameter eccentrically located on said cylindrical outside diameter of said second hub and a second outer cushion ring including an inside diameter eccentrically located on an outside diameter of the second inner cushion ring,
wherein said first and second inner cushion rings include respective inside diameters that are larger than and located eccentrically relative to the respective cylindrical outside diameters of the first and second hubs, and wherein said first and second outer cushion rings include respective inside diameters that are larger than and located eccentrically relative to the respective outside diameters of the first and second inner cushion rings, said outside diameters of the first and second outer cushion rings are adapted to be contacted and deflected by link plates of an associated chain that meshes with said teeth of said sprocket;
first and second retaining devices connected to the first and second hubs to capture the first and second sets of cushion rings on the first and second hubs, respectively.

2. The cushion ring sprocket assembly as set forth in claim 1, wherein said first set of cushion rings comprises only said first inner and said first outer cushion rings, and wherein said second set of cushion rings comprises only said second inner and said second outer cushion rings.

3. The cushion ring sprocket assembly as set forth in claim 1, wherein said first and second inner cushion rings are identical to each other, and wherein said first and second outer cushion rings are identical to each other.

4. The cushion ring sprocket assembly as set forth in claim 3, wherein said first and second inner cushion rings are different in radial thickness as compared to the first and second outer cushion rings.

5. The cushion ring sprocket assembly as set forth in claim 1, wherein said first and second inner cushion rings are different in radial thickness as compared to the first and second outer cushion rings.

6. The cushion ring sprocket assembly as set forth in claim 1, wherein the first and second outer cushion rings are axially aligned with the first and second inner cushion rings, respectively.

7. A chain drive system comprising:
a chain;
a cushion ring sprocket assembly comprising:
a sprocket body comprising a plurality of teeth arranged in a row, first and second opposite axial tooth faces, first and second hubs extending axially outward relative to the first and second tooth faces, said first and second hubs including respective cylindrical outside diameters;
first and second sets of metal cushion rings captured on said first and second hubs, respectively;
said first set of cushion rings comprising at least: (i) a first inner cushion ring including an inside diameter eccentrically located on said cylindrical outside diameter of said first hub and adapted to move eccentrically on said outside diameter of said first hub; and (ii) a first outer cushion ring including an inside diameter eccentrically located on an outside diameter of the first inner cushion ring and adapted to move eccentrically relative to the outside diameter of the first inner cushion ring, said second set of cushion rings comprising at least: (i) a second inner cushion ring including an inside diameter eccentrically located on said cylindrical outside diameter of said second hub and adapted to move eccentrically on said outside diameter of said second hub; and (ii) a second outer cushion ring including an inside diameter eccentrically located on an outside diameter of the second inner cushion ring and adapted to move eccentrically relative to the second inner cushion ring, wherein said chain comprises rollers or bushings meshed with said teeth and said chain comprises link plates located adjacent said first and second opposite axial tooth faces, wherein some of said chain link plates located adjacent said first axial tooth face are in contact with an outside diameter of said first outer cushion ring and some of said chain link plates located adjacent said second axial tooth face are in contact with an outside diameter of said second outer cushion ring, and wherein said first and second outer cushion rings are in contact with said first and second inner cushion rings, respectively.

8. The chain drive system as set forth in claim 7, wherein said first set of cushion rings comprises only said first inner and said first outer cushion rings, and wherein said second set of cushion rings comprises only said second inner and said second outer cushion rings.

9. The chain drive system as set forth in claim 7, wherein said first and second inner cushion rings are identical to each other, and wherein said first and second outer cushion rings are identical to each other.

10. The chain drive system as set forth in claim 9, wherein said first and second inner cushion rings are different in radial thickness as compared to the first and second outer cushion rings.

11. The chain drive system as set forth in claim 7, wherein said first and second inner cushion rings are different in radial thickness as compared to the first and second outer cushion rings.

12. A method of meshing a chain with a cushion ring sprocket assembly, said method comprising:
   rotating a body of the sprocket assembly and meshing a chain with teeth of the rotating sprocket body so that rollers or bushings of the chain are received in tooth spaces between successive teeth and so that chain link plates are located adjacent first and second axial tooth faces of the sprocket body;
   contacting and deflecting a first outer metal cushion ring with chain link plates located adjacent said first axial tooth face of said sprocket body;
   contacting and deflecting a second outer metal cushion ring with chain link plates located adjacent said second axial tooth face of said sprocket body;
   contacting and deflecting a first inner metal cushion ring with the first outer cushion ring, wherein said first inner cushion ring is eccentrically captured on a first hub of the sprocket body and wherein said first outer cushion ring is eccentrically captured on and axially aligned with the first inner cushion ring;
   contacting and deflecting a second inner metal cushion ring with the second outer cushion ring, wherein said second inner cushion ring is eccentrically captured on a second hub of the sprocket body and wherein said second outer cushion ring is eccentrically captured on and axially aligned with the second inner cushion ring.

\* \* \* \* \*